UNITED STATES PATENT OFFICE.

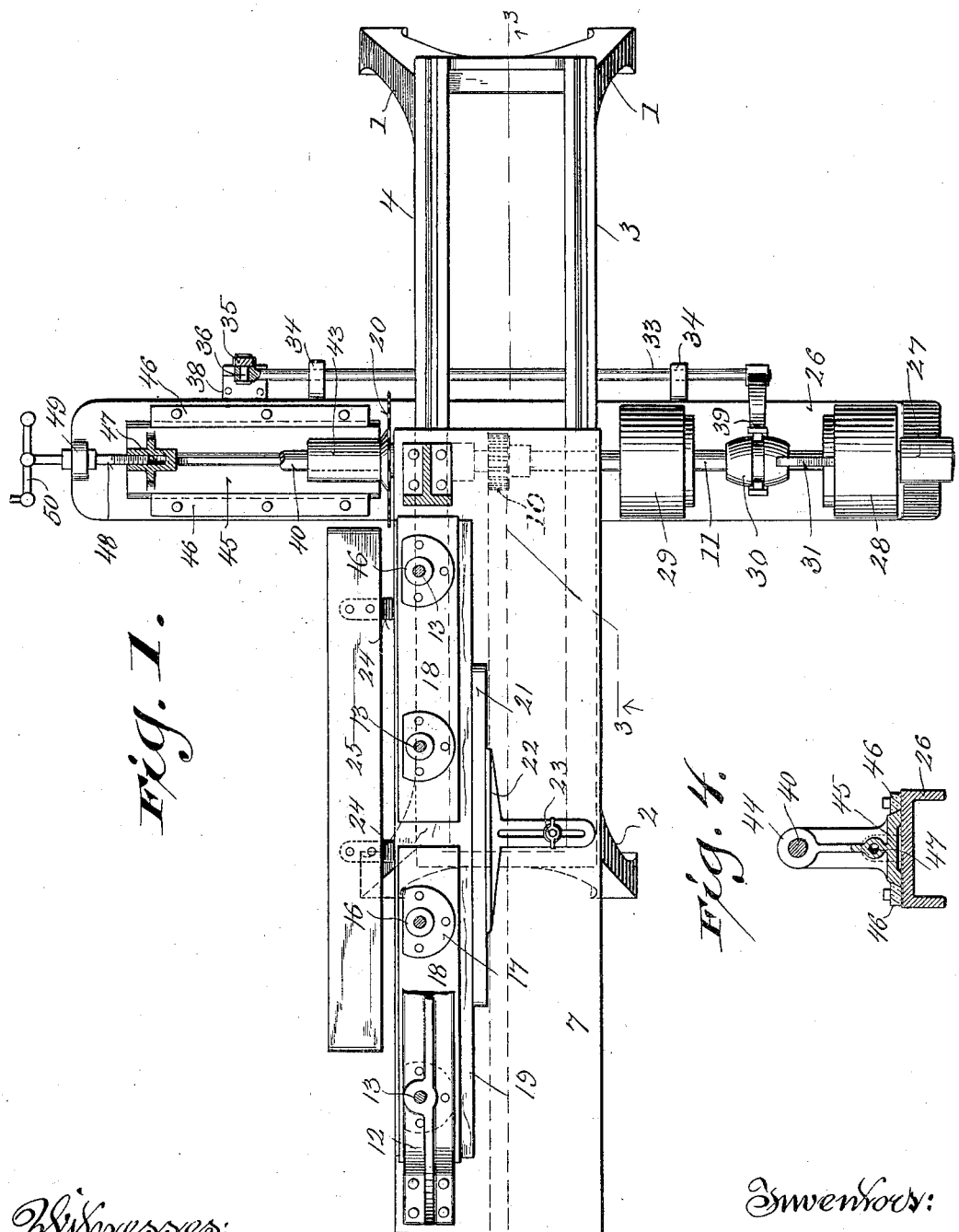

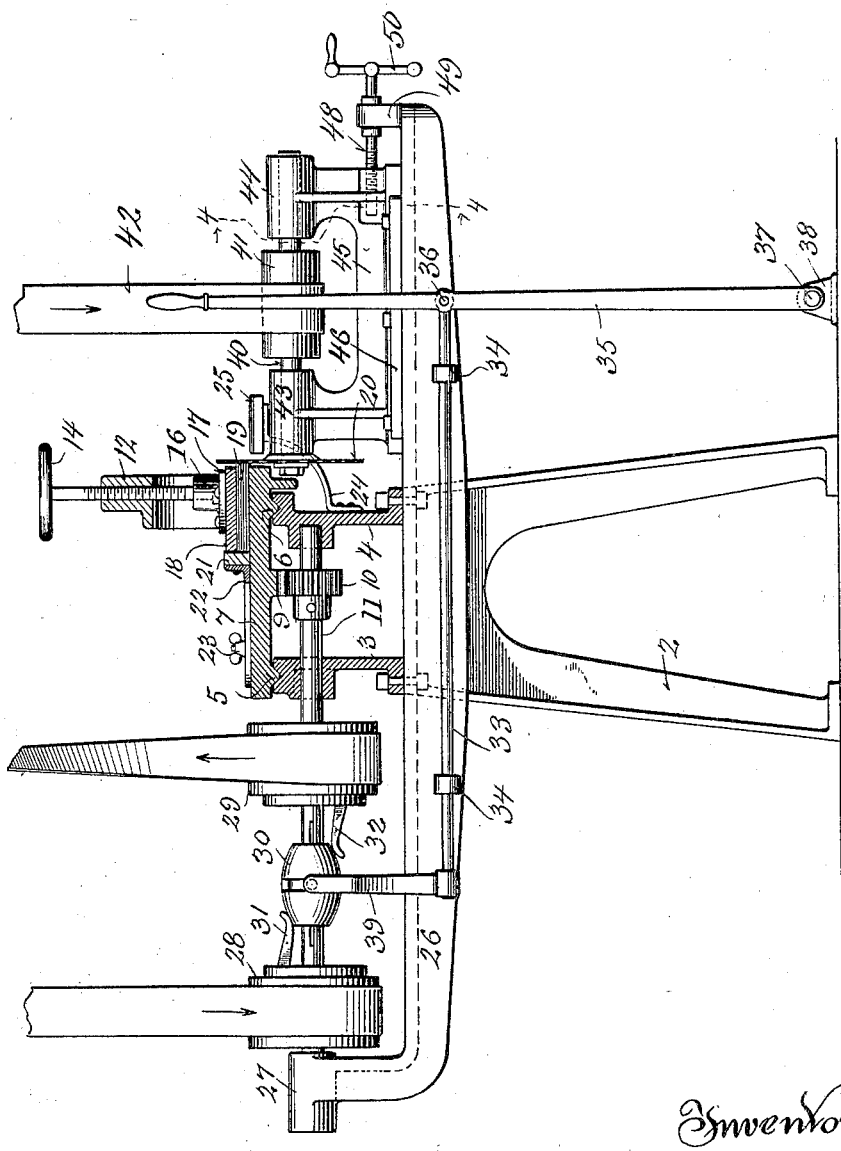

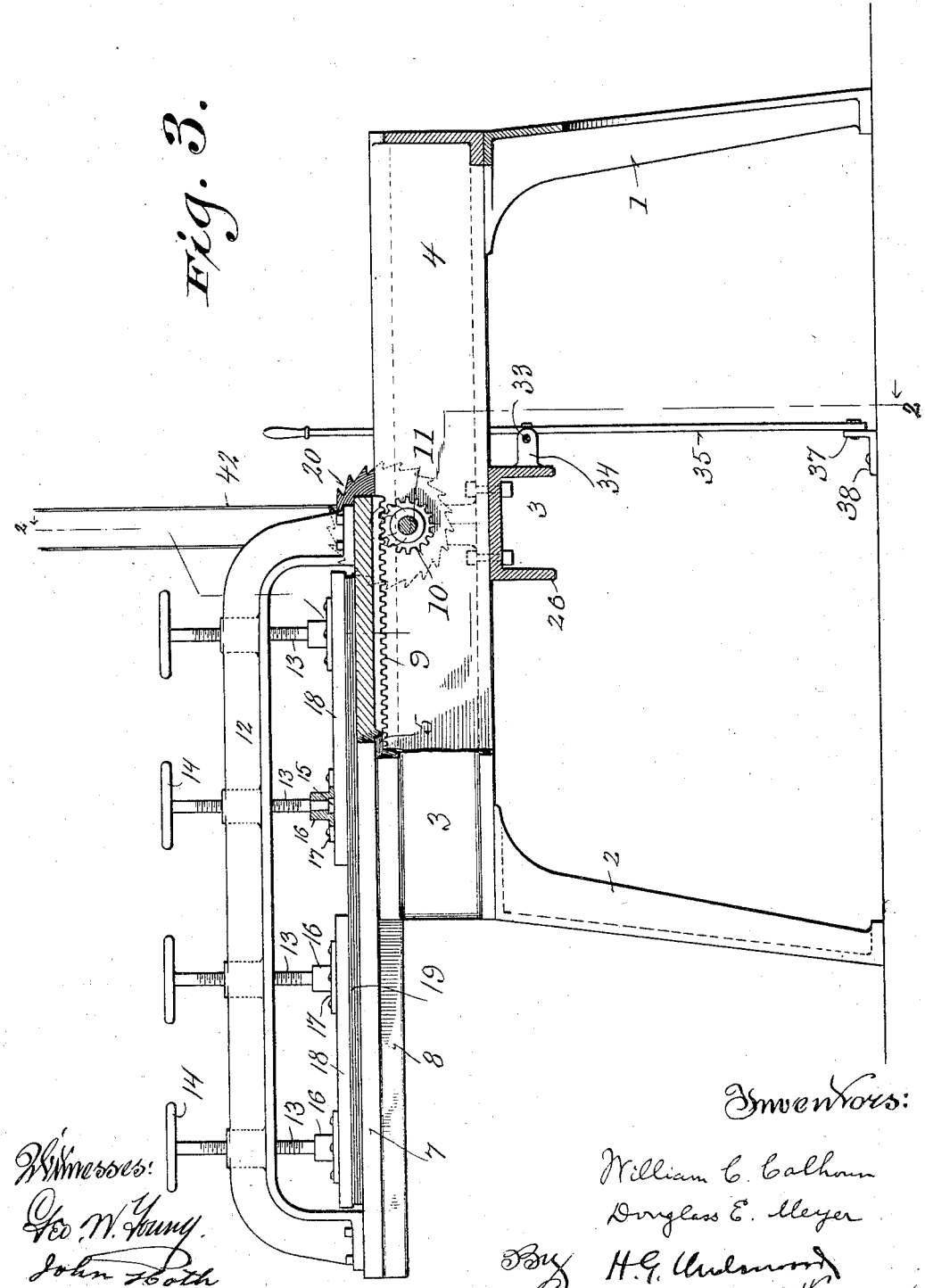

WILLIAM C. CALHOUN AND DOUGLASS E. MEYER, OF SHEBOYGAN, WISCONSIN, ASSIGNORS TO FROSTS VENEER SEATING COMPANY, OF SHEBOYGAN, WISCONSIN.

MACHINE FOR EDGING VENEERS.

SPECIFICATION forming part of Letters Patent No. 726,403, dated April 28, 1903.

Application filed February 24, 1903. Serial No. 144,590. (No model.)

*To all whom it may concern:*

Be it known that we, WILLIAM C. CALHOUN and DOUGLASS E. MEYER, citizens of the United States, and residents of Sheboygan, in the county of Sheboygan and State of Wisconsin, have invented certain new and useful Improvements in Machines for Edging Veneers; and we do hereby declare that the following is a full, clear, and exact description thereof.

Our invention relates to devices for edging veneers, so that same may be of the desired width, with smooth edges; and it consists in certain peculiarities of construction and combination of parts, as will be fully set forth hereinafter in connection with the accompanying drawings and subsequently claimed.

In said drawings, Figure 1 is a plan view of our improved machine, partially broken away or in section to better illustrate certain details of construction. Fig. 2 is a transverse sectional view taken on the planes indicated by the lines 2 2 in Fig. 3. Fig. 3 is a view in side elevation and partly in section on the plane indicated by the line 3 3 in Fig. 1, and Fig. 4 is a detail sectional view on the line 4 4 of Fig. 2.

Referring by numerals to the drawings, 1 2 represent the legs or standards of our machine, connected by two longitudinal side pieces 3 4, formed with grooved guideways in their upper surfaces for the reception of correspondingly-shaped longitudinal guide-ribs 5 6 on the under side of the carriage 7, there being also a longitudinal guard-rail 8, depending from the under side of the carriage, just beyond the rib 6, and between the two ribs 5 6 the said carriage is provided with a longitudinally-disposed rack-bar 9 for engagement with a pinion 10, fast on a transverse shaft 11, which has its inner bearings in the said side pieces 3 4. The upper surface of the carriage 7 is flat, like a table, and at the edge above the rib 6 and rail 8 is provided with a yoke or arched support 12, tapped at intervals for the reception of threaded rods 13 13, whose upper ends are fitted with hand-wheels 14 14 and whose lower ends terminate in heads 15, which freely revolve within caps 16, (beneath the shoulders of the bores in said caps, as shown in Fig. 3,) and the latter are formed with base-plates 17, by means of which they are secured to presser-boards 18. In the illustration given there are shown two of these boards 18, each being connected, as above described, to two of the rods 13, the strips or layers of veneer 19 to be edged being held between the table-top of the carriage 7 and the under side of the presser-boards 18, the edges to be trimmed projecting beyond the edges of the carriage-top and presser-boards and in the path of the saw 20, while the opposed edges of the veneer strips bear against the straight-edge 21, forming part of the gage 22, secured in the desired position on the carriage-top by the screw and thumb-nut 23, as shown. Supported by brackets 24, extending out from the side piece 4, is a longitudinally-arranged table 25 to receive and support the waste strips as they are being sawed off from the veneer strips 19 in the operation of edging the latter.

Bolted to flanges on the described side pieces 3 4 is a transverse truss 26, one end of which is upturned and formed into a bearing 27 for the outer end of the hereinbefore-named shaft 11. This shaft carries two pulleys 28 29, with reversing clutch mechanism, as indicated by the double-conical slide 30 on said shaft, and the clutch-dogs 31 32 for engagement therewith, the specific construction of the clutch mechanism forming no part of our present invention.

33 is a rod movable in bearings 34 34, projecting from the truss 26, and 35 is a lever pivoted to one end of said rod at 36, the lower end of said lever being pivoted, as shown at 37, to a base-plate 38 and the other end of said rod carrying a spanner or fork 39 for moving the slide 30 when it is desired to reverse the motion of the shaft 11. Mounted on the other end of the truss 26 is the saw-supporting mechanism. The saw 20 is fast on one end of its shaft 40, to which shaft is secured the pulley 41, operated by the belt 42, and this shaft is supported in the bearings 43 44 of a slide-block 45, the lower side edges of the latter being beveled and movable between the corresponding guide-strips 46 46. As extreme nicety in the adjustment of the saw 20 is necessary, the outer end of the slide-block 45 is formed with a tapped horizontal bore 47 for the reception of the threaded end of the rod 48, which is supported in a bearing 49 on the adjacent end of the truss 26, said rod being manipulated by its crank 50 to move the slide-rod and saw supported thereby nearer to or farther from the carriage 7.

The operation of our machine will be readily understood from the foregoing description of its construction, taken in connection with the accompanying drawings, wherein the parts are represented in the position they occupy just after a cut is completed, the carriage being at the limit of its movement in that direction. To bring the carriage back into position for the next cut, the operator first turns the crank 50, so as to withdraw the saw 20 from the line of the cut, (to prevent scraping contact with the veneer edges,) and then throws the lever 35 over to the left, whereby the pulley 30 is firmly clutched to the shaft 11 and the other pulley loose on said shaft, the belts on said pulleys being understood as properly connected to the revolving power-shaft, (not shown,) and then the carriage will be brought back to its initial or starting position. The veneer strips to be edged (either the other edges of those just trimmed on one edge or a fresh supply, as the case may be) are properly adjusted on the carriage-top and the presser-boards 18 brought down on them to keep them straight and flat and the saw 20 adjusted to the desired distance from the cut required, and then the operator moves the lever 35 to the right and the pulley 29 is clutched to the shaft 11, with the other pulley loose thereon, and the carriage starts forward, carrying the strips against the revolving saw until the cut is completed, and so on with each fresh edge to be trimmed.

Our device will be found extremely efficient for the purpose desired and rapid and simple in operation, while, as described, extreme nicety of adjustment can be readily and quickly obtained.

Having thus described our invention, what we claim as new, and desire to secure by Letters Patent, is—

1. In a machine for edging veneers, the combination with a pair of end standards connected by longitudinal side pieces having guideways on their upper surfaces, of a reciprocating carriage traveling on said guideways, and formed with a flat top; a yoke-frame secured to said carriage-top adjacent to one edge thereof; a series of presser-boards adjustably supported by said yoke-frame; a transverse truss supported by said side piece; a slide-block movable on said truss; a revoluble shaft supported on said slide-block; a saw fast on the end of said shaft; and a device for moving said slide-block toward or from said carriage.

2. In a machine for edging veneers, the combination with a pair of end standards connected by longitudinal side pieces having guideways on their upper surfaces, of a reciprocating carriage traveling on said guideways, and formed with a flat top; a yoke-frame secured to said carriage-top adjacent to one edge thereof; a series of presser-boards adjustably supported by said yoke-frame; a longitudinal table, supported by brackets from the adjacent side piece, at the same plane as that of the carriage-top, but at some distance therefrom; a transverse truss supported by said side pieces; a slide-block movable on said truss; a revoluble shaft supported on said slide-block; a saw fast on the end of said shaft; and a device for moving said slide-block back and forth to vary the position of the saw in the line between said carriage and longitudinal table.

3. In a machine for edging veneers, the combination with a pair of end standards connected by longitudinal side pieces having guideways on their upper surfaces, of a reciprocating carriage having longitudinal guide-ribs for engagement with said guideways and an intermediate longitudinally-disposed rack-bar, on its under side, and a flat top; a yoke or arched support secured to one edge of said carriage-top, and formed with tapped bores at intervals; threaded rods passing through said bores, and having hand-wheels at their upper ends; presser-boards arranged in longitudinal series, and each board connected with the lower ends of each pair of said threaded rods; a transverse truss supported by said side pieces; a transverse shaft journaled at one end in an end of said truss, and at its other end in the said side pieces; a pinion fast on said shaft and in engagement with said rack-bar; a pair of pulleys and clutch mechanism therefor also on said shaft; a rod supported by said truss, and connected at one end with said clutch mechanism; a lever connected to the other end of said rod; a longitudinally-movable slide-block on said truss; a saw having a revoluble shaft supported by said slide-block, and means for moving said slide-block and saw toward or from said carriage.

In testimony that we claim the foregoing we have hereunto set our hands, at Sheboygan, in the county of Sheboygan and State of Wisconsin, in the presence of two witnesses.

WILLIAM C. CALHOUN.
DOUGLASS E. MEYER.

Witnesses:
C. A. KNUDSON,
WM. F. THOMAS.